United States Patent [19]

Karr

[11] Patent Number: 5,631,654
[45] Date of Patent: May 20, 1997

[54] BALLISTIC PROJECTILE TRAJECTORY DETERMINING SYSTEM

[75] Inventor: Thomas J. Karr, Alamo, Calif.

[73] Assignee: The Regents of the University of California, Oakland, Calif.

[21] Appl. No.: 595,441

[22] Filed: Feb. 5, 1996

[51] Int. Cl.[6] .................................................. G01S 13/58
[52] U.S. Cl. ............................ 342/107; 342/90; 250/342
[58] Field of Search .................................. 367/118, 906;
342/67, 107, 90, 96, 115, 140, 97; 244/3.16;
250/342, 332, 334; 356/4.01, 4.02, 4.03;
364/516, 517

[56] References Cited

U.S. PATENT DOCUMENTS

| | | | |
|---|---|---|---|
| 4,675,532 | 6/1987 | Carson | 250/332 |
| 5,140,329 | 8/1992 | Maughan et al. | 342/67 |
| 5,168,475 | 12/1992 | McNelis et al. | 367/127 |
| 5,300,780 | 4/1994 | Denney et al. | 250/342 |
| 5,537,119 | 7/1996 | Poore, Jr. | 342/90 |
| 5,570,094 | 10/1996 | Armstrong | 342/107 |

*Primary Examiner*—Daniel T. Pihulic
*Attorney, Agent, or Firm*—Henry P. Sartorio

[57] ABSTRACT

A computer controlled system determines the three-dimensional trajectory of a ballistic projectile. To initialize the system, predictions of state parameters for a ballistic projectile are received at an estimator. The estimator uses the predictions of the state parameters to estimate first trajectory characteristics of the ballistic projectile. A single stationary monocular sensor then observes the actual first trajectory characteristics of the ballistic projectile. A comparator generates an error value related to the predicted state parameters by comparing the estimated first trajectory characteristics of the ballistic projectile with the observed first trajectory characteristics of the ballistic projectile. If the error value is equal to or greater than a selected limit, the predictions of the state parameters are adjusted. New estimates for the trajectory characteristics of the ballistic projectile are made and are then compared with actual observed trajectory characteristics. This process is repeated until the error value is less than the selected limit. Once the error value is less than the selected limit, a calculator calculates trajectory characteristics such a the origin and destination of the ballistic projectile.

20 Claims, 7 Drawing Sheets

BALLISTIC PROJECTILE TRAJECTORY DETERMINING SYSTEM

The United States Government has rights in this invention pursuant to Contract No. W-7405-ENG-48 between the United States Department of Energy and the University of California, for the operation of Lawrence Livermore National Laboratory.

BACKGROUND OF THE INVENTION

1. Field of the Invention

This invention relates to determining of the path of a projectile. Specifically, the present invention relates to determining the path of a ballistic projectile in three dimensions using a stationary monocular sensor system.

2. Description of Related Art

Tracking or determining the path of a ballistic projectile (i.e. a projectile which is freely falling after an initial thrust) has substantial applications in many fields. In military applications for example, by determining the path of an incoming ballistic projectile, military personnel can be moved away from the projectile's impact point. Likewise, by determining the origin of the projectile, counter-measures can be directed at the origin of the projectile, thereby destroying the projectile launcher.

Numerous ballistic projectile tracking systems are found in the prior art. However, prior art ballistic projectile path determining systems require a plurality of projectile sensors to determine the three-dimensional path of the projectile. As an example, U.S. Pat. No. 5,168,475 to McNelis et al., filed Feb. 18, 1992 entitled "Method and Apparatus for Determining the Trajectory of a Supersonic Projectile" requires at least three sensors. Other prior art systems attempt to reduce the required number of projectile sensors by moving the projectile sensors. The projectile sensors are moved such that the moved projectile sensors observe the ballistic projectile from several different locations. Thus, prior art ballistic projectile path determining systems require numerous projectile sensors and/or moving of the sensors during the flight of the projectile.

Unfortunately prior art multi-sensor or moving sensor ballistic path determining systems are not always useful. Specifically, each of the separate sensors must communicate with a central unit which calculates the trajectory of the projectile based on the reading received from a sensor. Communicatively coupling each of the separate sensors to the central unit is not always convenient or even feasible. Furthermore, moving the sensors is open not possible. For example, although military personnel receiving incoming ballistic projectile fire may desire to know the origin of the ballistic projectiles, such military personnel are often restricted to their current location.

Thus, a need exists for a system which determines the trajectory of a ballistic projectile in three dimensions without requiring multiple projectile sensors, a system which does not require moving a projectile sensor or sensors, and a system which accurately determines the trajectory of a ballistic projectile in three dimensions including the point of launch and the point of impact of the ballistic projectile.

DISCLOSURE OF THE INVENTION

It is therefore an object of the present invention to provide a system which determines the trajectory of a ballistic projectile in three dimensions without requiring multiple projectile sensors, a system which does not require moving the projectile sensor or sensors, and a system which accurately determines the trajectory of a ballistic projectile in three dimensions. The above object is achieved with a computer controlled ballistic projectile three-dimensional trajectory determining system utilizing a single stationary projectile sensor, an estimator, a comparator, and a ballistic projectile trajectory path calculator.

A computer controlled system for determining the three-dimensional trajectory of a ballistic projectile is disclosed. Specifically, in one embodiment, predictions of state parameters for a ballistic projectile are received at an estimator to initialize the system. The estimator uses the predictions of state parameters to estimate first trajectory characteristics of the ballistic projectile. A single stationary monocular sensor then observes the actual first trajectory characteristics of the ballistic projectile. A comparator generates an error value related to the predicted state parameters by comparing the estimated first trajectory characteristics of the ballistic projectile with the observed first trajectory characteristics of the ballistic projectile. If the error value is equal to or greater than a selected limit, the predictions of the state parameters are adjusted. New estimates for the trajectory characteristics of the ballistic projectile are made and are then compared with actual observed trajectory characteristics. This process is repeated until the error value is less than the selected limit. Once the error value is less than the selected limit, a calculator calculates trajectory characteristics such as the origin and destination of the ballistic projectile.

In another embodiment, once the error value is less than the selected limit, instead of calculating trajectory characteristics of the ballistic projectile, the system estimates at least one additional trajectory characteristic of the ballistic projectile. The single stationary monocular sensor then observes the additional trajectory characteristics of the ballistic projectile. The comparator generates an error value related to the predicted state parameters by comparing the estimated trajectory characteristics of the ballistic projectile with the observed trajectory characteristics of the ballistic projectile. If the error value is equal to or greater than a second selected limit (which is smaller than the first selected limit) the predictions of the state parameters are adjusted. New estimates for the trajectory characteristics of the ballistic projectile are made and are then compared with actual observed trajectory characteristics. This process is repeated until the error value is less than the second selected limit. Once the error value is less than the second selected limit, a calculator calculates trajectory characteristics such as the origin and destination of the ballistic projectile. In so doing, the present embodiment further improves the accuracy of the estimated state parameters. As a result, the calculated trajectory is more accurate.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
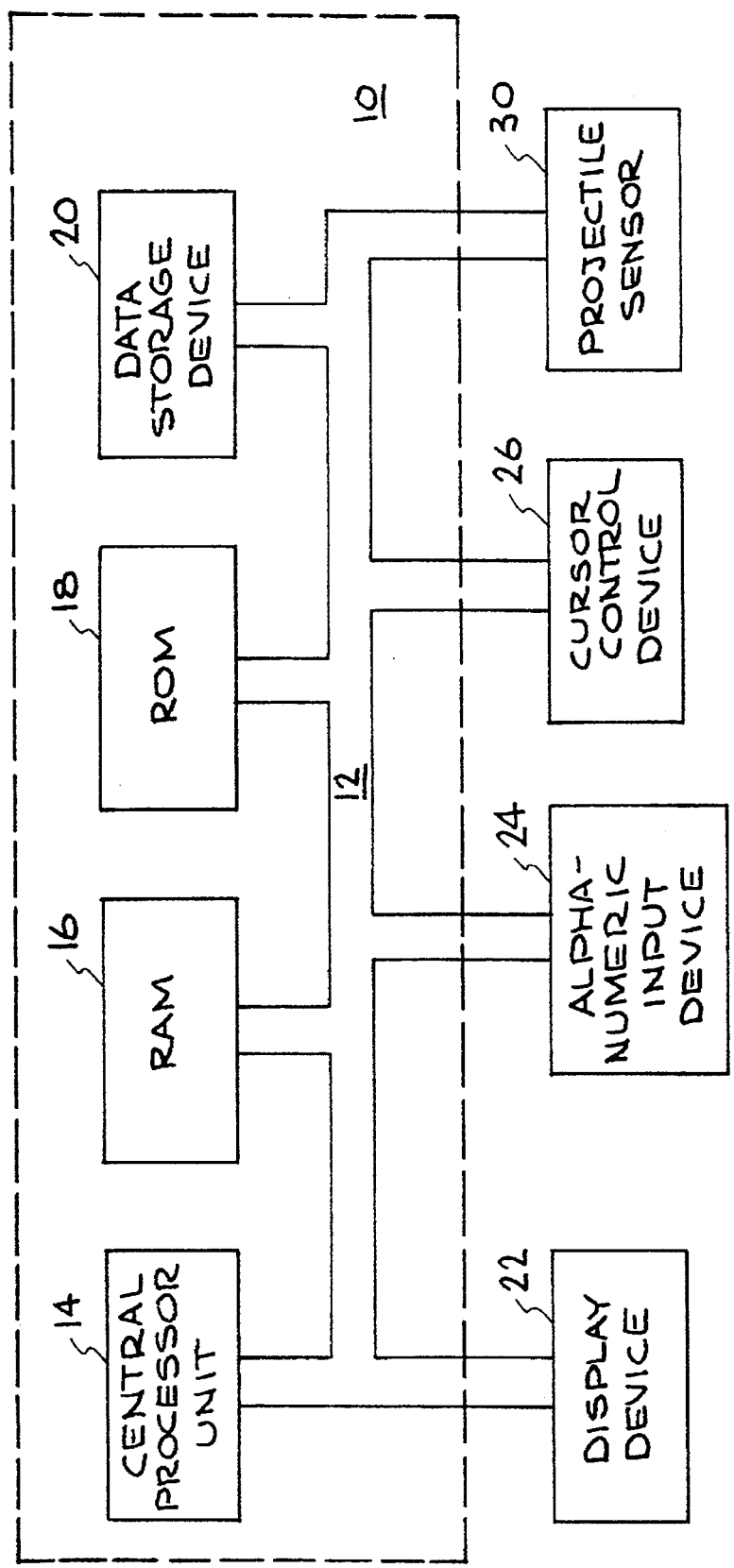
FIG. 1 is a block diagram of a computer system of a ballistic projectile three-dimensional trajectory determining system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "estimating", "calculating", "determining", "displaying" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present ballistic projectile three-dimensional trajectory determining invention are comprised of computer executable instructions which reside in a computer system. FIG. 1 illustrates an exemplary computer system 10 used as a part of a computer controlled ballistic projectile three-dimensional trajectory determining system in accordance with the present invention. It is appreciated that the computer system 10 of FIG. 1 is exemplary only and that the present invention can operate within a number of different computer systems including general purpose computers systems, embedded computer systems, and computer systems specially adapted for determining ballistic projectile trajectories.

Computer system 10 of FIG. 1 includes an address/data bus 12 for communicating information, a central processor unit 14 coupled to bus 12 for processing information and instructions. Computer system 10 also includes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. Computer system 10 of the present embodiment also includes a display device 22 coupled to bus 12 for displaying information (e.g., trajectory characteristics of a ballistic projectile) to a computer user. An alphanumeric input device 24 including alphanumeric and function keys is coupled to bus 12 for communicating information and command selections to central processor unit 14. Computer system also includes a cursor control device 26 coupled to bus 12 for communicating user input information and command selections to central processor unit 14, and a signal input output comm device 28 (e.g. a modem) coupled to bus 12 for communicating command selections to central processor unit 14. As yet another feature of the present embodiment, computer system 10 also includes a projectile sensor 30 coupled to bus 12.

Display device 22 of FIG. 1, utilized with computer system 10 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 2:
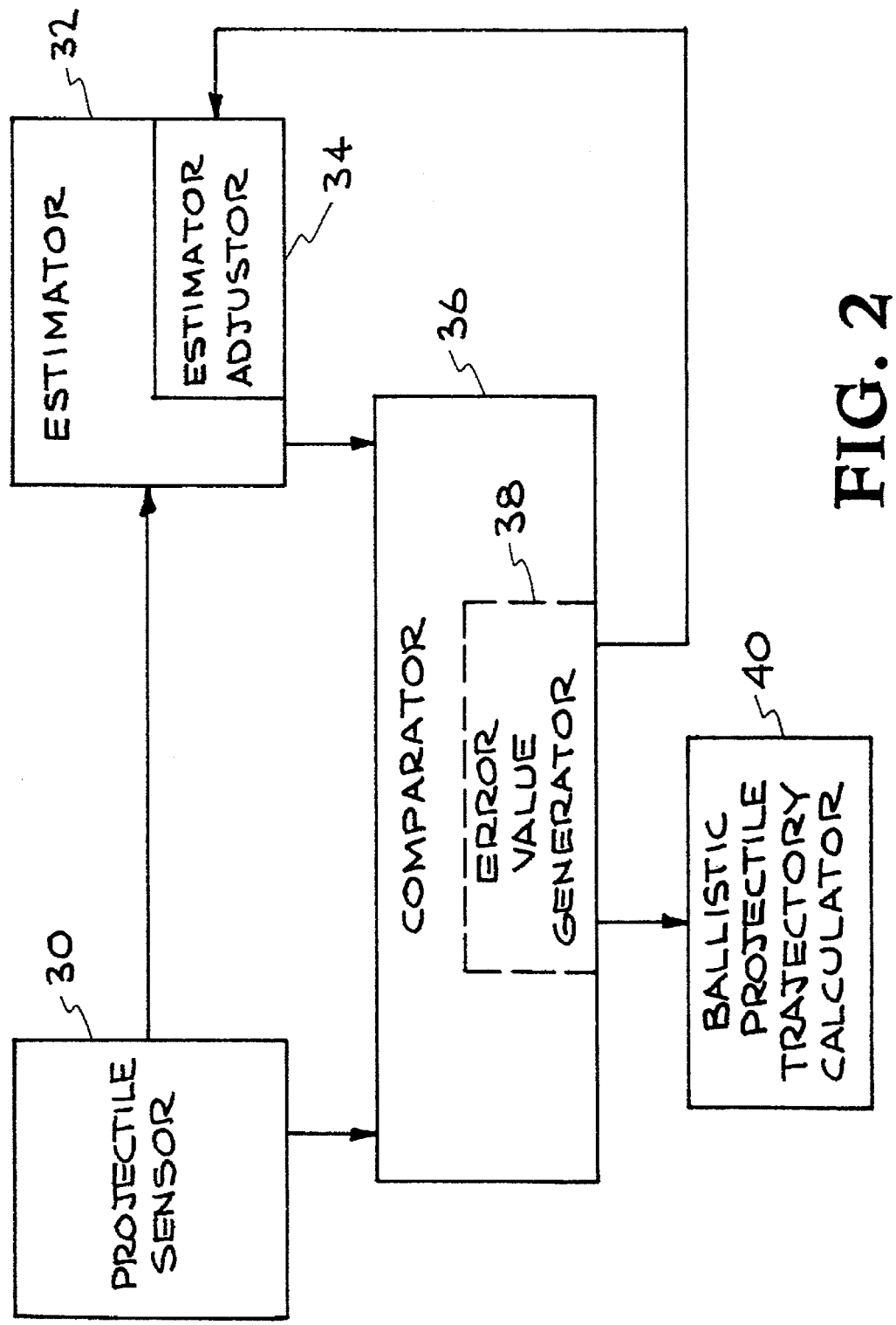
FIG. 2 is a logical representation of components of a computer controlled ballistic projectile three-dimensional trajectory determining system in accordance with the present invention.

FIG. 2 is a logical representation of components of the present computer controlled ballistic projectile three-dimensional trajectory determining system. These components of FIG. 2 include an estimator 32 including an estimator adjuster 34, a comparator 36 having an error value generator 38, a ballistic projectile trajectory calculator 40, and projectile sensor 30. Estimator 32 with estimator adjuster 34, comparator 36 with error value generator 38, and ballistic projectile trajectory calculator 40 are implemented as executable instructions within computer system 10 of FIG. 1. A more detailed discussion of the components of the present invention and the steps performed by the components is found below.

GENERAL DESCRIPTION OF TRAJECTORY DETERMINING PROCESS OF THE PRESENT INVENTION

Figure 3:
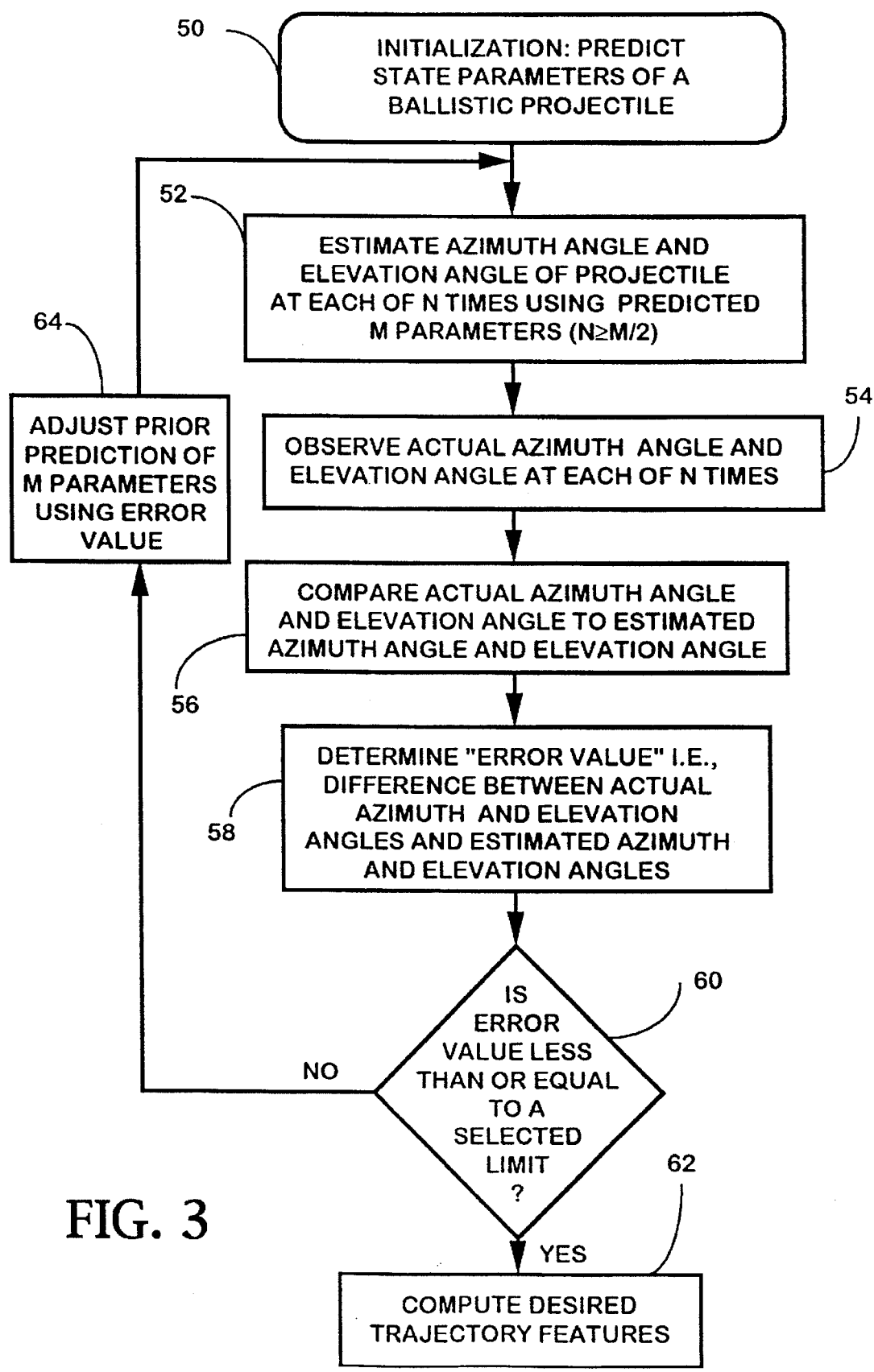
FIG. 3 is a flow chart illustrating steps employed by a computer controlled ballistic projectile three-dimensional trajectory determining system in accordance with the present invention.

With reference next to FIG. 3, a flow chart illustrating steps employed by the ballistic projectile trajectory determining (BPTD) process 31 of the present invention is shown. As shown in FIG. 3, the computer controlled ballistic projectile three-dimensional trajectory determining system begins operation with an initialization step 50. During initialization step 50, estimator 32 receives predictions of state parameters of a ballistic projectile. In the present invention, the predicted state parameters can be received at estimator 32 in any of numerous ways. For example, a user of the present computer controlled ballistic projectile three-dimensional trajectory determining system can enter best "guesses" of the parameters using, for example, alpha-numeric input device 24 or cursor control device 26 of FIG. 1. Alternatively, an initial observation of the ballistic projectile made by projectile sensor 30 of FIG. 1 can be transferred via bus 12 of FIG. I to estimator 32. Estimator 32 then uses the received information to generate predictions of the state parameters of the ballistic projectile. In one embodiment of the present invention, estimator 32 receives a prediction of m state parameters for the ballistic projectile, where m is an integer greater than or equal to 7. In the present embodiment, estimator 32 and estimator adjuster 34 reside, for example, in central processor unit 14 of FIG. 1.

In step 52, estimator 32 estimates trajectory characteristics of the ballistic projectile based upon the predicted state parameters which were received by estimator 32 in step 50. In the present embodiment, estimator 32 estimates both an azimuth angle and an elevation angle for the ballistic projectile at each of N times. Furthermore, in the present embodiment, estimator 32 estimates both an azimuth angle and an elevation angle for the ballistic projectile at each of N times where the N is greater than or equal to m/2. The estimated trajectory characteristics of the ballistic projectile are then passed over bus 12 and stored in, for example, RAM 18 of computer system 10.

In step 54, sensor 30 of the present computer controlled ballistic projectile three-dimensional trajectory determining system observes the actual trajectory characteristics of the ballistic projectile at each of the N times used by estimator 32. In the present embodiment, projectile sensor 30 is comprised of a single stationary angle-only monocular sensor which is focused into a region in which a ballistic projectile is expected to travel. Therefore, each time projectile sensor 30 detects the ballistic projectile two observations (i.e. azimuth angle and elevation angle) are made. Although a single stationary angle-only monocular sensor is used in the present embodiment, the present invention is also well suited to the use of other projectile sensors such as for example, a passive staring array infrared detector, a visible detector, a scanning infrared detector, and the like. Furthermore, the present invention is also well suited to the use of a non-optical projectile sensor, such as, for example, an acoustic projectile sensor. In the present embodiment, sensor 30 observes both the azimuth angle and the elevation angle at each of the N times used by estimator 32 in step 52. Thus, the present invention estimates the trajectory characteristics a ballistic projectile will have at each of N times, and the present invention actually observes the trajectory characteristics of the ballistic projectile at each of the N times.

As shown in step 56, the estimated trajectory characteristics of the ballistic projectile are passed, for example, from RAM 18 over bus 12, both of FIG. 1, to comparator 36 of FIG. 2. In the present embodiment, comparator 36 and error value generator 38 reside, for example, in central processor unit 14 of FIG. 1. The actual observed trajectory characteristics of the ballistic projectile at each of the N times is transferred from, for example, sensor 30 to comparator 36. Comparator 36 compares the estimated trajectory characteristics of the ballistic projectile with the actual observed trajectory characteristics of the ballistic projectile. That is, in the present embodiment, the estimated azimuth and elevation angles at each of N times are compared with actual observed azimuth and elevation angles of the projectile at each of the N times.

In step 58, error generator 38 of comparator 36 generates an error value indicative of the difference between the actual observed trajectory characteristics of the ballistic projectile and the estimated trajectory characteristics of the ballistic projectile. Although comparator 36 and error value generator 38 reside in central processor unit 14 in the present embodiment, the present invention is also well suited to having comparator 36 and error value generator 38 reside, for example, elsewhere in computer system 10 or even outside of computer system 10. In the present embodiment, the error value is transferred via bus 12 to memory such as, for example, RAM 18 of computer system 10.

At step 60, after error generator 38 of comparator 36 generates an error value, the error value is compared to a selected limit. In one embodiment, the selected limit is entered, for example, by a user of computer system 10 using alpha-numeric input device 24. The selected limit is then stored in memory such as, for example, RAM 18. Provided the error value if less than or equal to the selected limit, the present invention performs step 62. When the generated error value is greater than the selected limit, the present invention performs step 64.

In step 62, ballistic projectile trajectory calculator 40 of FIG. 2 computes trajectory characteristics of the ballistic projectile. In one embodiment, ballistic projectile trajectory calculator 40 determines the impact and launch points of the ballistic projectile in a three-dimensional coordinate system. In such an embodiment, the impact and launch points of the ballistic projectile are output, for example, via bus 12 to display device 22 both of FIG. 1. Thus, the present invention is able to visually inform a user of the present computer controlled ballistic projectile three-dimensional trajectory determining system of the impact and launch points of the ballistic projectile. The present invention is also well suited to numerous other types of output informing a user of the impact and launch points of the ballistic projectile. Such outputs include, but are not limited to, audio outputs, hard copy outputs, and the like. In the present embodiment, ballistic projectile trajectory calculator 40 resides, for example, in central processor unit 14 of FIG. 1. However, the present invention is also well suited to having ballistic projectile trajectory calculator located other than in central processor unit 14.

As shown in FIG. 3, provided that the generated error value is greater than the selected limit, the present invention performs step 64. In step 64, the error value generated by error value generator 38 is output to error adjuster 34 of estimator 32, all of FIG. 2. Error adjuster 34 uses the generated error value signal to adjust the initial state parameter predictions received at estimator 32. That is, if the error value indicates that the state parameters predictions were too high, the state parameter predictions are adjusted accordingly. After the state parameter predictions are appropriately adjusted by estimator adjuster 34 using the error value signal, steps 52 through 60 are repeated. Provided the error value if less than or equal to the selected limit, the present invention performs step 62. If the generated error value is greater than the selected limit, the present invention performs step 64 again using the newly generated error value and repeats step 52–60 until the error value if less than or equal to the selected limit. Once the error value signal is less than or equal to the selected limit, the present invention performs step 62.

Figure 4A:
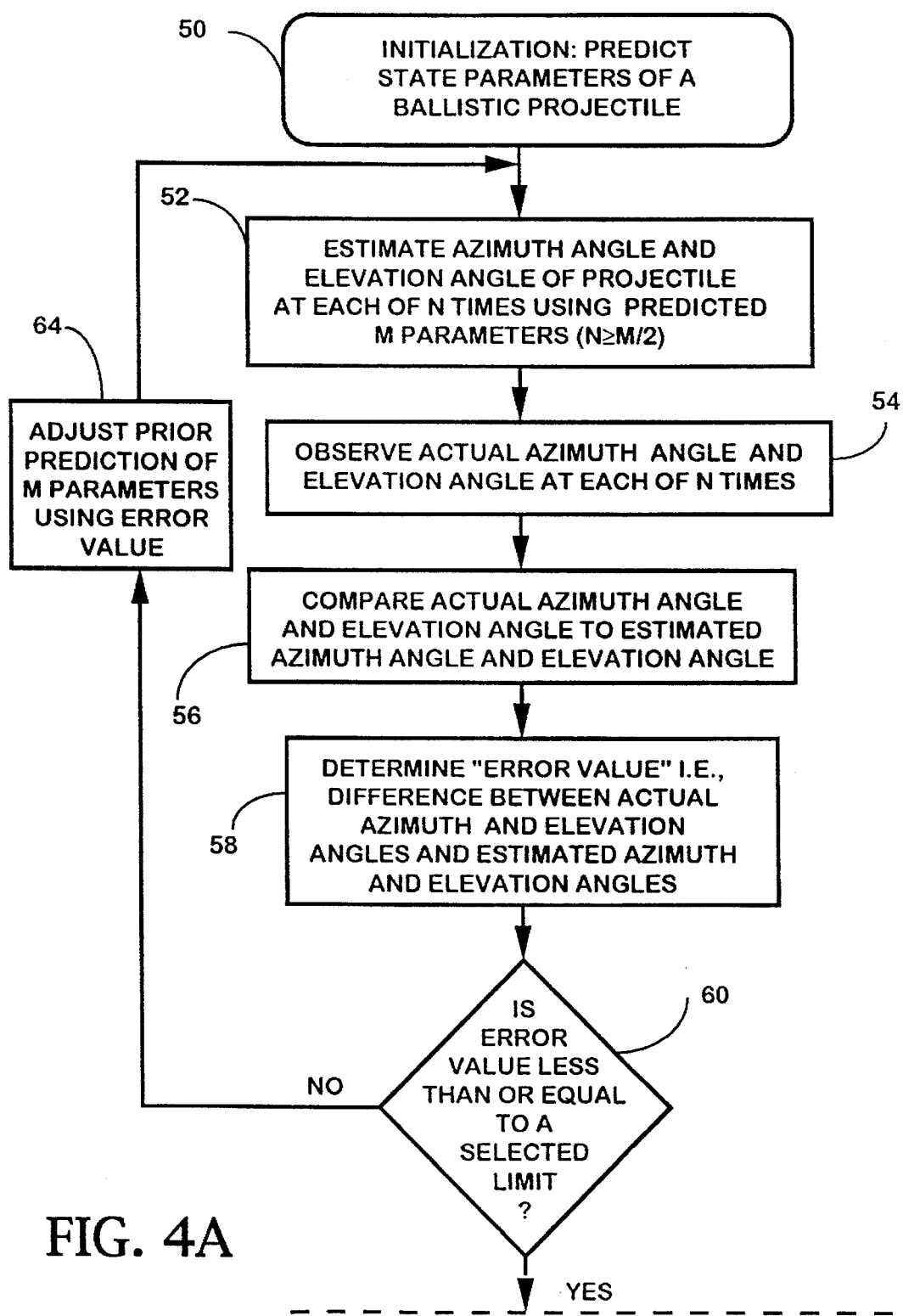
FIG. 4 is a flow chart illustrating another embodiment of steps employed by a computer controlled ballistic projectile three-dimensional trajectory determining system in accordance with the present invention.
Figure 4B:
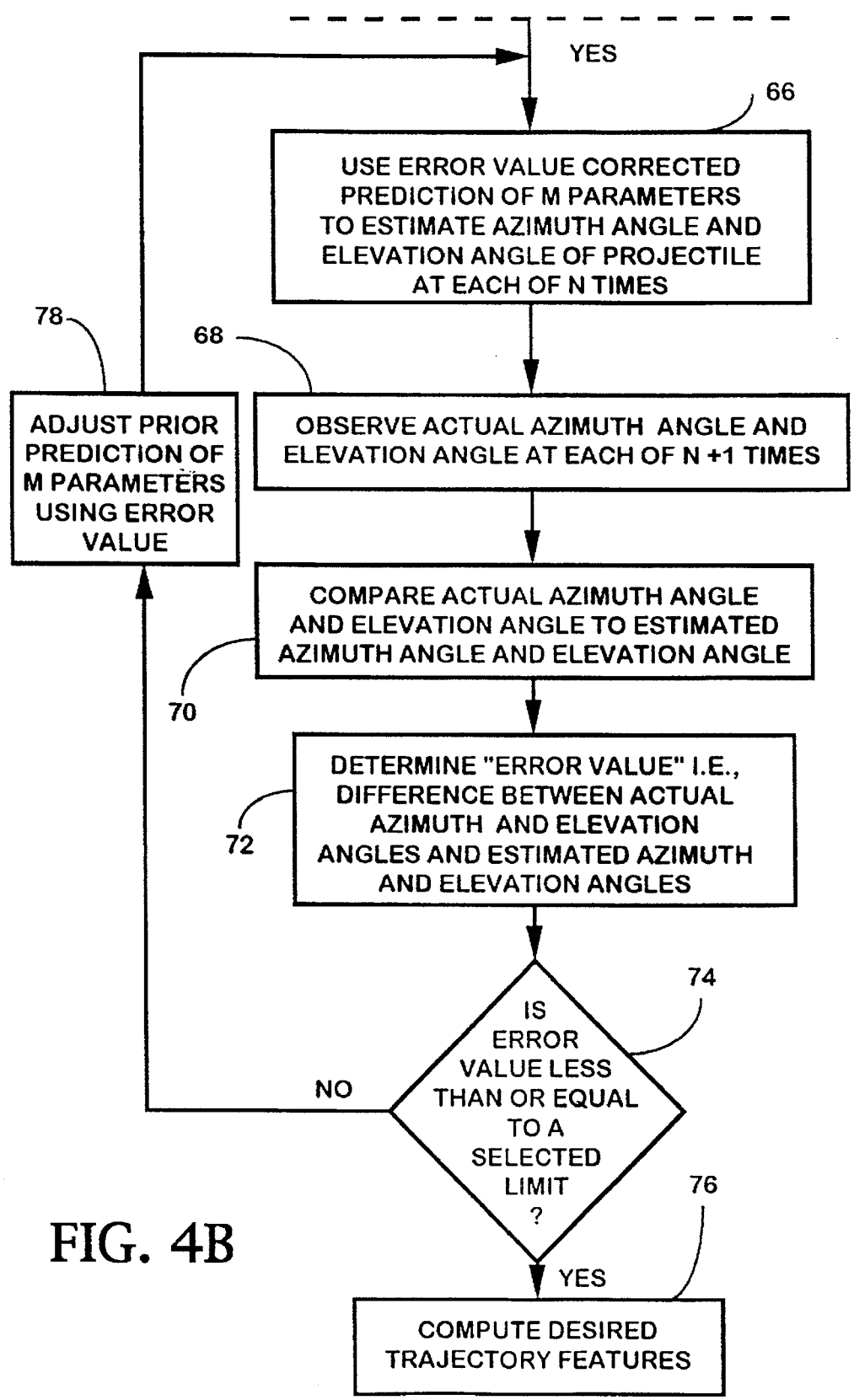

With reference next to FIG. 4, a flow chart illustrating steps employed by another embodiment of the present invention is shown. In the embodiment of FIG. 4, steps 50 through 60 as recited in the embodiment of FIG. 3 are performed. However, once the error value signal is less than or equal to the selected limit, step 62 of FIG. 3 is not performed. Instead, as shown in step 66, once the error value signal is less than or equal to the selected limit, estimator 32 calculates at least one additional trajectory characteristic. Thus, instead of calculating trajectory characteristics at N times, estimator 32 calculates trajectory characteristics at N+1 times. As in the embodiment of FIG. 3, estimator 32 estimates both an azimuth angle and an elevation angle for the ballistic projectile at each of N+1 times. The estimated trajectory characteristics of the ballistic projectile are then passed over bus 12 and stored in, for example, RAM 18 of computer system 10. By increasing the number of times for which trajectory characteristic estimates are made, the present invention improves the accuracy of ballistic projectile trajectory calculator 40 of FIG. 2.

In step 68, sensor 30 of the present computer controlled ballistic projectile three-dimensional trajectory determining system observes the actual trajectory characteristics of the ballistic projectile at each of the N+1 times used by estimator 32. Sensor 30 observes both the azimuth angle and the elevation angle at each of the N+1 times used by estimator 32 in step 66.

As shown in steps 70, the estimated trajectory characteristics of the ballistic projectile are passed, for example, from RAM 18 over bus 12, both of FIG. 1, to comparator 36 of FIG. 2. In the present embodiment, comparator 36 and error value generator 38 reside, for example, in central processor unit 14 of FIG. 1. The actual observed trajectory characteristics of the ballistic projectile at each of the N+1 times is transferred from, for example, sensor 30 to comparator 36. As described above in conjunction with the embodiment of FIG. 3, comparator 36 compares the estimated trajectory characteristics of the ballistic projectile with the actual observed trajectory characteristics oft he ballistic projectile.

In step 72, error generator 38 of comparator 36 generates an error value indicative of the difference between the actual observed trajectory characteristics of the ballistic projectile and the estimated trajectory characteristics of the ballistic projectile. In the present embodiment, the error value is transferred via bus 12 to memory such as, for example, RAM 18 of computer system 10.

At step 74, after error generator 38 of comparator 36 generates an error value, the error value is compared to a selected limit. In one embodiment, the selected limit is entered, for example, by a user of computer system 10 using alpha-numeric input device 24. The selected limit is then stored in memory such as, for example, RAM 18. Provided the error value if less than or equal to the selected limit, the present invention performs step 62. When the generated error value is greater than the selected limit, the present invention performs step 64.

In step 76, ballistic projectile trajectory calculator 40 of FIG. 2 computes trajectory characteristics of the ballistic projectile as described above. Provided that the generated error value is greater than the selected limit, the present invention performs step 78. In step 78, the error value generated by error value generator 38 is output to error adjuster 34 of estimator 32, all of FIG. 2. Error adjuster 34 uses the generated error value signal to adjust the initial state parameter predictions received at estimator 32. That is, if the error value indicates that the state parameters predictions were too high, the state parameter predictions are adjusted accordingly. After the state parameter predictions are appropriately adjusted by estimator adjuster 34 using the error value signal, steps 66 through 74 are repeated. Once the error value signal is less than or equal to the selected limit, the present invention performs step 76. By increasing the number of times for which trajectory characteristic estimates are made, the present invention improves the accuracy of the predicted launch and impact points determined by ballistic projectile trajectory calculator 40 of FIG. 2. The present invention is also well suited to repeating the process described in the embodiment of FIG. 4 such that each time the error value is less than or equal to a selected limit, the number of times for which trajectory characteristic estimate are made is increased. In so doing, at each iteration the selected limit for the error value becomes smaller. By decreasing the selected limit the accuracy with which ballistic projectile trajectory calculator determines the impact and launch points is increased.

DETAILED DESCRIPTION OF TRAJECTORY DETERMINING PROCESS OF THE PRESENT INVENTION

Figure 5:
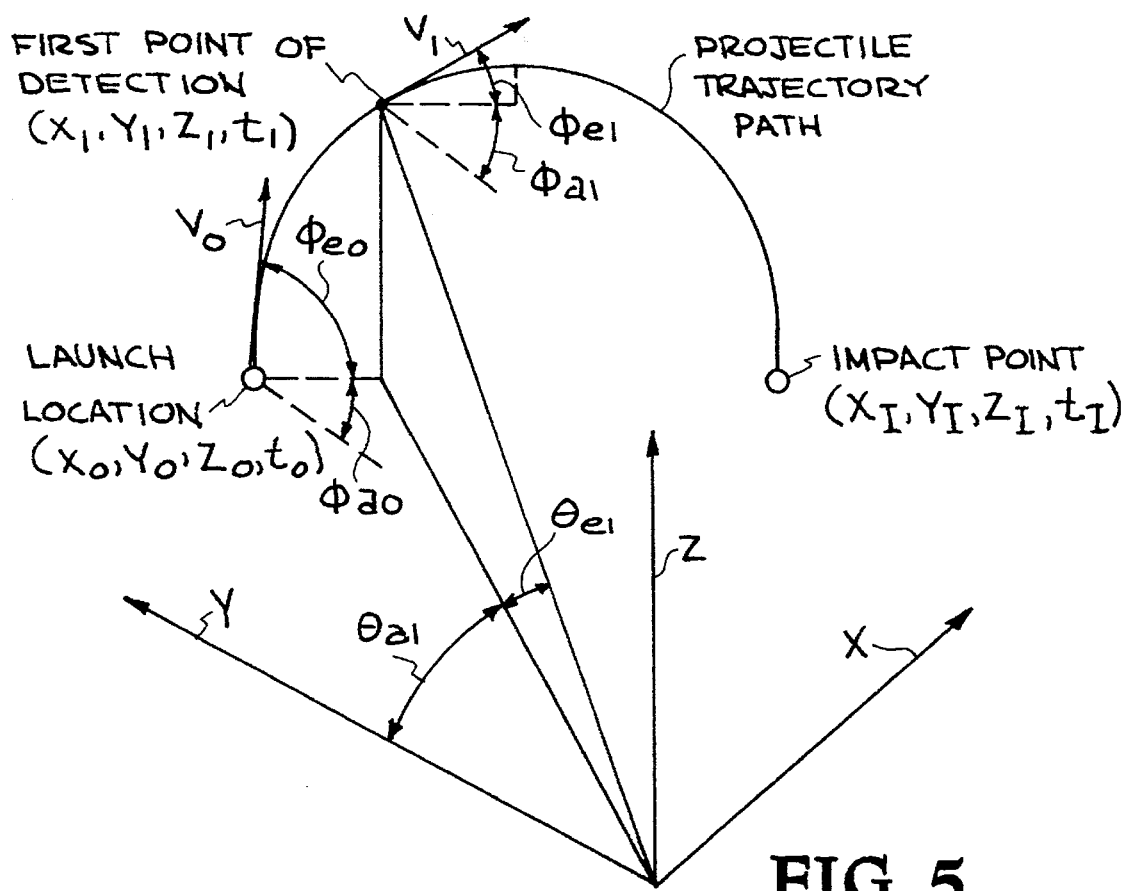
FIG. 5 is a diagram illustrating ballistic projectile trajectory features in accordance with the present invention.

The following is a detailed description of steps employed by (BPTD) process 31 of the present invention. The following discussion sets forth in detail procedures, processes and steps utilized by components of the present invention to determine trajectory characteristics of a ballistic projectile in three dimensions. As stated above many of the components of the present invention are implemented as executable instructions within computer system 10 of FIG. 1. Although numerous procedures are recited in great detail, the present invention is also well suited using variations of the following procedures. With reference now to FIG. 5, a diagram illustrating ballistic projectile trajectory components is shown. As stated above, in step 50 of the (BPTD) process 31 estimator 32 receives predictions of state parameters of a ballistic projectile. The state parameters of a ballistic projectile at any time are given by the projectile's position, velocity, and ballistic coefficient. For a Cartesian coordinate system, both position and velocity have x-coordinate, y-coordinate, and z-coordinate components. Thus, three parameters define position, three parameters define velocity, and one parameter defines the ballistic coefficient. Therefore, a minimum of seven parameters are needed by estimator 32 to define the state of a ballistic projectile traveling in air. By defining the seven state parameters of a ballistic projectile, forward prediction to the impact point and backward prediction to the launch location can be achieved by ballistic projectile trajectory calculator 40 of FIG. 2 during step 62 of (BPTD) process 31 of FIG. 3. In the present embodiment, because in-plane motion of a ballistic projectile is dominated by the aerodynamic drag and gravity, the only forces considered to be acting on the ballistic projectile are aerodynamic drag and gravity. It will be understood that other forces such as, for example, crosswind, atmospheric density and temperature, projectile spin, and the Coriolis force, could affect the trajectory of the ballistic projectile. Although not considered in the present embodiment, the present invention is also well suited to considering such forces in the (BPTD) process. The processes used by estimator 32 and ballistic projectile trajectory calculator 40 are described below.

In FIG. 5, a ballistic projectile is launched at time t=to from a location $(x_o, y_o, z_o)$ with respect to a reference frame (X, Y, Z). For example, the reference frame may be chosen aligned with a local navigation frame such as East, North, and Up. Although a Cartesian coordinate system is used to define the location of the ballistic projectile in the present embodiment, the present invention is also well suited to various other coordinate system, such as, for example, polar coordinate systems. A stationary monocular angle-only sensor 30 with a given field-of-view and detection range will detect the projectile at time of first detection $t=t_1$, at a position $(x_1, Y_1, z_1)$ and velocity $v_1$ at a flight path angle of $\phi_{e1}$ and trajectory azimuthal angle off $\phi_{a1}$. It will be understood that while the flight path angle $\phi_{e1}$ will change with the position of the ballistic projectile, the trajectory azimuthal angle $\phi_{a1}$ will remain constant. Each time projectile sensor 30 detects the ballistic projectile two observations (i.e. azimuth and elevation angles $\theta_a$ and $\theta_e$, respectively) are made. Thus, if the ballistic projectile is detected in N frames, 2N angular measurements are recorded.

Figure 6:
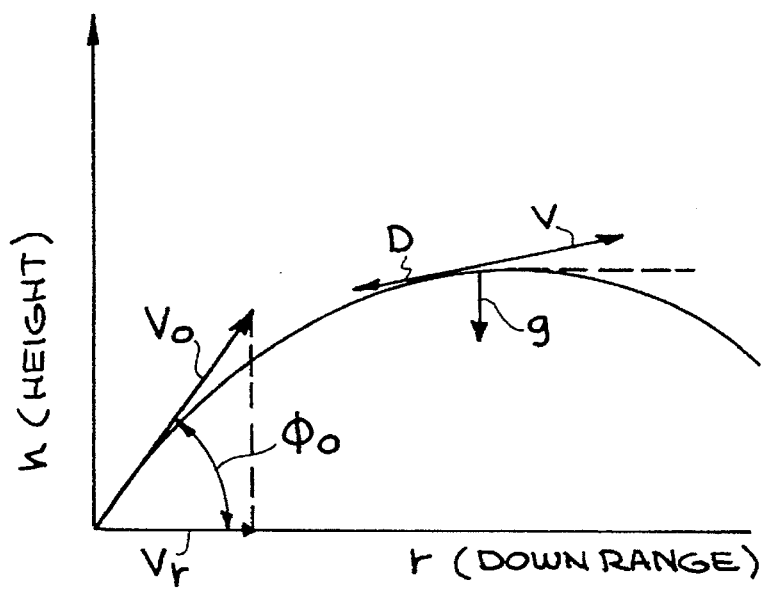
FIG. 6 is a diagram illustrating in-plane motion of a ballistic projectile in accordance with the present invention.

With reference next to FIG. 6, in-plane motion of a ballistic projectile is shown. For an accurate real-time prediction of trajectory characteristics estimator 32 must be able to precisely propagate the ballistic projectile state vector in a forward and backward. Likewise, for an accurate real-time prediction of launch or impact points, ballistic projectile trajectory calculator 40 must be able to precisely propagate the ballistic projectile state vector in both forward and backward directions. In the present embodiment, estimator 32 and ballistic projectile trajectory calculator 40 employ Euler's formulation [3] in steps 52 and 62 respectively, for estimating and computing trajectory characteristics of the ballistic projectile.

Euler's formulation [3] is employed by estimator 32 and ballistic projectile trajectory calculator 40 in steps 52 and 62 respectively, as follows. As shown in FIG. 4, the ballistic projectile's trajectory is described in a rectangular coordinate system (r, c, h) for down-range, cross-range, and height. The flight path angle is $\phi$. For example, at launch, $\phi=\phi_o$, at maximum altitude, $\phi=0$, and at impact, $\phi=\phi_f$. The equation of motion is given by:

$$\frac{dv}{dt} = D + g + F_w \tag{1}$$

$$= -\frac{0.5\rho C_D A}{m}|v|v + g + F_w,$$

$$= -a_D|v|v + g + F_w,$$

where $a_D=0.5*rC_DA/m$ is the drag coefficient and $F_w$ is the out-of-plane wind-induced force (neglected for simplicity). In general the drag is a function of the speed v and the atmospheric density and temperature, which are functions of altitude h. In the present embodiment, for purposes of clarity, it is assumed that $a_D$ is constant. Resolving step (1) into components, one obtains:

$$\frac{dv_r}{dt} = -a_D V v_r \tag{2}$$

$$\frac{dv_h}{dt} = -a_D V v_h - g$$

$$\frac{dv_c}{dt} = F_w$$

where $V=|v|\equiv\sqrt{v_r^2+v_h^2}$. Note that there are no known analytical closed form solutions of step (2) when $a_D$, the drag coefficient, is non-zero. The Euler solution [3] of step (2) can be computed from:

$$r(\phi) = t_0 + \frac{1}{\sqrt{2a_D g}} \{T(\phi_0, k_0) - T(\phi, k_0)\}, \tag{3a}$$

$$r(\phi) = r_0 + \frac{1}{2a_D} \{R(\phi_0, k_0) - R(\phi, k_0)\}, \tag{3b}$$

$$h(\phi) = h_0 + \frac{1}{2a_D} \{H(\phi_0, k_0) - H(\phi, k_0)\}, \tag{3c}$$

where $t(\phi)$, $r(\phi)$, and $h(\phi)$ are the time, down range, and height of the ballistic projectile expressed in terms of the flight path angle $\phi$ and the functions T, R and H. The parameter $k_o$ is given by:

$$k_o = \xi(\phi_o) + (g/2a_D)v_{ro}^{-2}, \tag{4}$$

where $v_{ro}$ is the initial horizontal velocity, and $x(\phi_o)$ is given by the relation:

$$\xi(\phi) = 0.5 \left\{ \tan(\phi)\sec(\phi) + \ln\left[\tan\left(\frac{\phi}{2} + \frac{\pi}{4}\right)\right] \right\}. \tag{5}$$

In practice T(), R() and H() are precomputed two-dimensional ballistic tables that are interpolated for greater resolution.

The Euler solution, [3], is especially convenient for use by estimator 32 and ballistic projectile trajectory calculator 40 in steps 52 and 62 respectively, for forward- or back-projecting the state vector over a long distance, for example to locate the impact point or the launch point given the state vector at some intermediate point. However, it is sometimes computationally simpler, for a given level of accuracy, to project the trajectory over long distances by means of precomputed ballistic tables of step (3) than to directly integrate the equations of motion.

In embodiments of the present invention, during step 52 of BPTD process 31 estimator 32 estimates trajectory characteristics of a ballistic projectile for each of N times. To describe the three-dimensional trajectory of a ballistic projectile for the purposes of estimating its state vector as a function of time, one could either transform the planar motion to the earth-fixed rectangular coordinate system such as the Cartesian coordinate system of FIG. 5, or one could resolve the equation of motion along the X, Y, & Z components. In the present embodiment, the latter approach is numerically more stable and computationally less intensive. The appropriate equations of motion utilized by estimator 32 during step 52 of BPTD process 31 are given by:

$$\begin{cases} \dot{x} = & v_x \\ \dot{y} = & v_y \\ \dot{z} = & v_z \\ \dot{v}_x = & -a_D |\vec{V} - \vec{W}|(v_x - w_x) \\ \dot{v}_y = & -a_D |\vec{V} - \vec{W}|(v_y - w_y) \\ \dot{v}_z = & -a_D |\vec{V} - \vec{W}|(v_z - w_z) - g \\ \dot{a}_D = & 0 \end{cases} \quad (6)$$

where $V$ is the total velocity and $w_x$, $w_y$, and $w_z$ are the three components of wind dynamics. The state vector consists of three positions, three velocities, and the ballistic coefficient. Although a simplified ballistic coefficient is used in the present embodiment, the estimator 32 is also well suited to the use of a more sophisticated model with several free parameters during the operation of step 52 of BPTD process 31. Step (6) can be succinctly written as:

$$\frac{dx}{dt} = f(x, u, t), \quad (7)$$

where $x$ is the 7-element state vector, $f()$ is the vector function of the state vector, and $u$ is a vector of external forces including the three components of wind and the gravity. Given an initial value of the state vector at any point on the trajectory, step (7) can be integrated forward to predict the trajectory of the ballistic projectile. Letting $F()$ be the numerical solution of step (7) given initial condition $x_0$, in general the state vector at any time $t$ is given as:

$$x(t) = F(t; x_0, u). \quad (8)$$

Estimator 32 receives predicted state parameters for a ballistic projectile. That is, the requisite seven parameters needed to define the state of a ballistic projectile traveling in air are received at the estimator. In the present invention, the predicted state parameters can be received at estimator 32 in any of numerous ways. For example, a user of the present computer controlled ballistic projectile three-dimensional trajectory determining system can enter best "guesses" of the parameters using, for example, alpha-numeric input device 24 or cursor control device 26 of FIG. 1. Alternatively, an initial observation of the ballistic projectile made by projectile sensor 30 can be used by estimator 32 to generate predictions of the state parameters of the ballistic projectile.

In the present embodiment, estimator 32 of FIG. 2 employs the following procedure to estimate the 7-element state vector for a ballistic projectile. At a first ballistic projectile detection at time $t_1$ the ballistic projectile 7-element state vector is described by:

$x_1 = $ x position
$y_1 = $ y position
$z_1 = $ z position
$v_{x1} = $ x velocity
$v_{y1} = $ y velocity
$v_{z1} = $ z velocity
$a_D = $ drag coefficient However, for purposes of the present invention, the last element $a_D$, the drag coefficient, is replaced by the logarithmic function of b, the ballistic coefficient.

With reference again to FIG. 5, $\theta_a(k)$ and $\theta_e(k)$ are the azimuth and elevation angles, respectively, of the ballistic projectile measured by projectile sensor 30 located at the origin of the reference frame (X, Y, Z). The measurement at time $t_k$, $k=1,2,\ldots$ is related to the state vector at time $t_1$ as follows:

$$\theta_a(k) = \tan^{-1}\left(\frac{x(k)}{y(k)}\right), \quad (9)$$

and $$\theta_e(k) = \tan^{-1}\left(\frac{z(k)}{\sqrt{x^2(k) + y^2(k)}}\right), \quad (10)$$

where from step (8)

$$\begin{cases} x(k) = & x(k; x_1, u) \\ y(k) = & y(k; x_1, u) \\ z(k) = & z(k; x_1, u) \end{cases} \quad (11)$$

Estimator 32 of FIG. 2, estimates $x_1$ using all subsequent angular observations made by projectile sensor 30. The 7-element state vector at time $t_1$ specifies the observed angles at any later time. That is, estimator 32 of the present invention provides an estimate of trajectory characteristics of the ballistic projectile such as the azimuth and elevation angles for each of N subsequent times. Furthermore, in the present embodiment, estimator 32 estimates the state vector at first detection via a least-mean-squares procedure as follows.

A combined 2N-element azimuth and elevation measurement vector such as is provided by sensor 30 of the present invention is defined as:

$$Z_N = [\theta_a(1), \theta_a(2), \ldots, \theta_a(N); \theta_e(2), \ldots, \theta_e(N)]^T \quad (12)$$

where N may be as large as 1000 for a 10 seconds of observation at 100 Hz frame rates. Letting x represent the 7-element state vector and using $h_N(x)$ to represent the relations given in steps (9) & (10), the measurement vector can be written as:

$$Z_N = h_N(x) + w; \quad (13)$$

where w is a 2N dimensional vector of measurement noise.

In the present embodiment, the state vector is estimated using the ordinary least squares method. After several iterations, the state vector converges to a stable result close to the true state vector. The measured elevation and azimuth angles are nonlinear functions (trigonometric functions) of the state vector. It will be understood by those of ordinary skill in the art, that noise in the measurements produces a bias in the least-squares state vector. That is, the average least-squares state vector error is non-zero and depends on the noise. To get a state vector estimate with zero average error, and therefore smaller total error, a more general method known as the total least squares method must be used.

The application of ordinary least squares requires the minimalization of a scalar function with respect to x as follows:

$$J(x) = (Z_N - h_N(x))^T (Z_N - h_N(x)). \quad (14)$$

In the present embodiment, a Levenberg and Marquardt iterative search algorithm finds the minimum of step (14).

In an embodiment where an initial observation of the ballistic projectile made by projectile sensor 30 is used by estimator 32 to generate predictions of the state parameters of the ballistic projectile, if the local gravity vector is known, an initial estimate of the state vector at the first point of detection can be obtained using the following approximation:

$$\begin{cases} x(t) = & x_1 + v_{x1}t + \frac{1}{2}a_{x1}t^2 \\ y(t) = & y_1 + v_{y1}t + \frac{1}{2}a_{y1}t^2 \\ z(t) = & z_1 + v_{z1}t + \frac{1}{2}a_{z1}t^2 - \frac{1}{2}gt^2, \end{cases} \quad (15)$$

where g is the known gravity. In the example of step 15, the unknown variables are the position of the ballistic projectile in the x, y, and z coordinates, the velocity of the ballistic projectile in the x, y, and z coordinates, and the acceleration of the ballistic projectile in the x, y, and z coordinates. The two angle measurements of azimuth and elevation at time t obtained from projectile sensor 30 gives:

$$m_1(t) = \tan(\theta_{az}) = \frac{x(t)}{y(t)}, \quad (16)$$

and $$m_2(t) = \tan(\theta_{el})\sec(\theta_{az}) = \frac{z(t)}{y(t)}. \quad (17)$$

Substituting step (15) for ballistic projectiles into steps (16) and (17) and rearranging fields:

$$\begin{bmatrix} 1 & -m_1 & 0 & t & -t \cdot m_1 & 0 & 0 & -m_1 t^2/2 & -t^2/2 \\ 0 & -m_2 & 1 & 0 & -t \cdot m_2 & t & 0 & -m_2 t^2/2 & -t^2/2 \end{bmatrix} \begin{bmatrix} x_1 \\ y_1 \\ z_1 \\ v_{x1} \\ v_{y1} \\ v_{z1} \\ a_{x1} \\ a_{y1} \\ a_{x1} \end{bmatrix} \quad (18)$$

$$= \begin{bmatrix} 0 \\ \frac{g}{2} t^2 \end{bmatrix}.$$

Since there are nine unknowns and each observation by projectile sensor 30 provides two measurements (azimuth and elevation angle) a minimum of five observations are needed to initialize the state vector. Although nine unknowns are cited in the example of step 15, the present invention is also well suited to having seven unknowns comprised of position of the ballistic projectile in the x, y, and z coordinates, the velocity of the ballistic projectile in the x, y, and z coordinates, and the ballistic coefficient. In such an example, a minimum of only four observations are needed to initialize the state vector. The presence of gravity terms on the right hand side of step (18) makes the solution feasible or observable.

The initial estimate of the last element of the state vector, the ballistic coefficient, is based on prior knowledge. The ballistic coefficient of a ballistic projectile such as a mortar or shell can be initialized at anything from 10000 to infinity, and then will converge to the correct value during the iterative estimation. A bullet ballistic coefficient can be initialized at ~500, and then will converge to the correct value. Thus, estimator 32 estimates trajectory characteristics of a ballistic projectile for each of N times during step 52 of BPTD process 31 using the above described processes.

As described above in conjunction with steps 56 through 64, the estimated trajectory characteristics of the ballistic projectile are passed, for example, from RAM 18 over bus 12, both of FIG. 1, to comparator 36 of FIG. 2. Comparator 36 compares the estimated trajectory characteristics of the ballistic projectile with the actual observed trajectory characteristics of the ballistic projectile. Once the error value if less than or equal to the selected limit, the present invention performs step 62. When the generated error value is greater than the selected limit, the present invention performs step 64.

Figure 7:
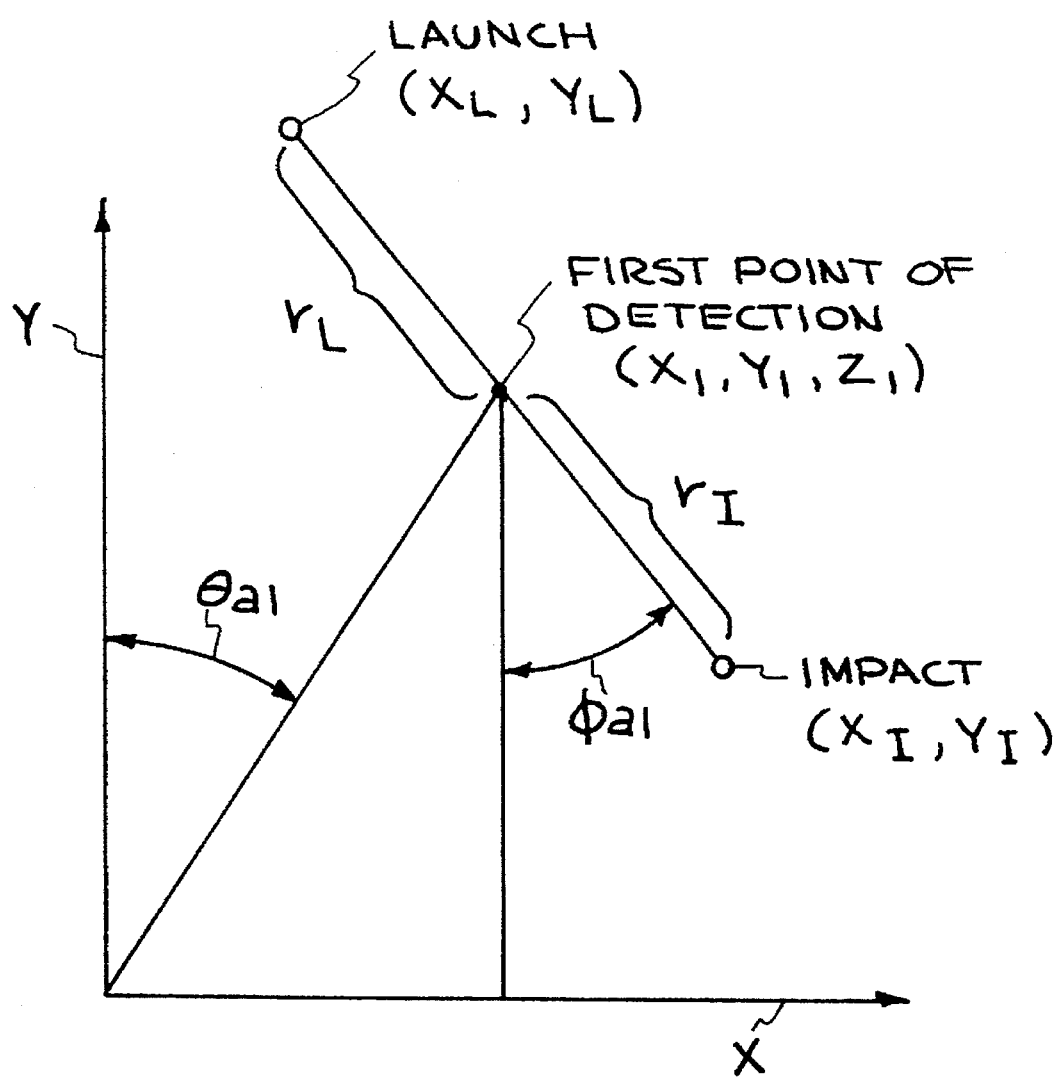
FIG. 7 is a diagram illustrating an overhead view of launch and impact points with respect to a first point of detection in accordance with the present invention.

With reference again to FIG. 7, a diagram illustrating an overhead view of launch and impact points with respect to a first point of detection is shown. As described above, at step 62 of the BPTD process 31, ballistic projectile trajectory calculator 40 of FIG. 2 computes trajectory characteristics such as, for example, impact and launch points of the ballistic projectile. In FIG. 7, the coordinates of the estimated first point of detection are (x1, y1, z1). The in-plane distance to the impact point from the first point of detection is given by $r_I$, and the in-plane distance to the launch point from the first point of detection is given by $r_L$. The in-plane distances can be found by solving for the roots $\phi_I$, $\phi_L$ of the step $$z_1 + h(\phi_{I,L}) = z_1 + \frac{1}{2a_D} \{H(\phi_1, k_1) - H(\phi_{I,L}, k_1)\} = 0, \quad (19)$$

and then computing the distance by the Euler method:

$$r_{I,L} = \frac{1}{2a_D} \{R(\phi_1, k_1) - R(\phi_{I,L}, k_1)\}. \quad (20)$$

The launch location and point of impact are then determined by ballistic projectile trajectory calculator 40 using the following processes:

Launch location:

$$\begin{cases} x_L = & x_1 + r_L \sin \phi_{a1} \\ y_L = & y_1 - r_L \cos \phi_{a1} \end{cases} \quad (21)$$

Impact location:

$$\begin{cases} x_I = & x_1 + r_1 \sin \phi_{a1} \\ y_I = & y_1 - r_1 \cos \phi_{a1} \end{cases} \quad (22)$$

As mentioned above, in one embodiment, the impact and launch points of the ballistic projectile are output, for example, via bus 12 to display device 22 both of FIG. 1. In so doing, the present invention visually informs a user of the present computer controlled ballistic projectile three-dimensional trajectory determining system of the impact and launch points of the ballistic projectile.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A ballistic projectile three-dimensional trajectory determining apparatus comprising:

an estimator communicatively coupled to receive predicted state parameters of a ballistic projectile and for estimating first trajectory characteristics of said ballistic projectile using said predicted state parameters;

a single stationary monocular sensor for observing said first trajectory characteristics of said ballistic projectile;

a comparator coupled to said single stationary monocular sensor and said estimator, said comparator adapted for determining a difference between said observed first trajectory characteristics received from said single stationary monocular sensor and said estimated first trajectory characteristics received from said estimator, and for generating an error based on said difference;

an estimator adjuster for receiving said error value from said comparator provided said error value is above a selected limit, said estimator adjuster further for adjusting said predicted state parameters of said ballistic projectile causing said estimator to re-estimate said first trajectory characteristics of said ballistic projectile using said adjusted predictions of said state parameters; and a ballistic projectile trajectory calculator coupled to said comparator for determining second trajectory characteristics of said ballistic projectile provided said error value is at or below said selected limit.

2. The ballistic projectile three-dimensional trajectory determining apparatus of claim 1 wherein said first trajectory characteristics include azimuth and elevation angles of said ballistic projectile.

3. The ballistic projectile three-dimensional trajectory determining apparatus of claim 1 wherein said single stationary monocular sensor is a passive staring array infrared detector.

4. The ballistic projectile three-dimensional trajectory determining apparatus of claim 1 wherein said second trajectory characteristics include the origin and destination of said ballistic projectile.

5. In a computer controlled ballistic projectile three-dimensional trajectory determining system including a processor coupled to a bus, a memory unit coupled to said bus for storing information, and a single stationary projectile sensor, a method for determining trajectory characteristics of said projectile, said method comprising the computer implemented steps of:

a) receiving, at an estimator, a prediction of state parameters for a ballistic projectile;

b) estimating first trajectory characteristics of said ballistic projectile using said predictions of said state parameters;

c) observing said first trajectory characteristics of said ballistic projectile using a single stationary monocular sensor;

d) generating an error value of said predicted state parameters based on a comparison between said estimated first trajectory characteristics of said ballistic projectile and said observed first trajectory characteristics of said ballistic projectile;

e) adjusting said predictions of said state parameters of said ballistic projectile provided said error value is equal to or greater than a selected limit and repeating steps b) through e) until said error value is less than said selected limit; and f) calculating second trajectory characteristics of said ballistic projectile provided said error value is less than said selected limit.

6. The method as recited in claim 5 wherein said step of receiving at an estimator a prediction of state parameters for a ballistic projectile further comprises the steps of:

receiving at an estimator an initial measurement of a position of a ballistic projectile;

determining, at said estimator, a prediction of said position of said ballistic projectile in three dimensions;

determining, at said estimator, a prediction of a velocity in three dimensions of said ballistic projectile at said position; and receiving, at said estimator, a prediction of a ballistic coefficient for said ballistic projectile.

7. The method as recited in claim 6 further comprising the step of:

receiving at said estimator a prediction of at least one additional said state parameter selected from the group consisting of ballistic projectile spin, coriolis effect, wind effects, atmospheric density, and atmospheric temperature.

8. The method as recited in claim 5 wherein said step of receiving at an estimator a prediction of state parameters for a ballistic projectile further comprises the step of:

receiving at an estimator a prediction of m state parameters for a ballistic projectile, wherein m is an integer greater than or equal to 7.

9. The method as recited in claim 8 wherein said step of estimating first trajectory characteristics of said ballistic projectile using said prediction of said state parameters further comprises the step of:

estimating at least m first trajectory characteristics of said ballistic projectile using said prediction of said state parameters.

10. The method as recited in claim 9 wherein said step of observing said first trajectory characteristics of said ballistic projectile using a single stationary monocular sensor further comprises the step of:

observing at least m first trajectory characteristics of said ballistic projectile using a single stationary monocular sensor.

11. The method as recited in claim 5 wherein said step of observing said first trajectory characteristics of said ballistic projectile using a single stationary monocular sensor further comprises the step of:

observing said first trajectory characteristics of said ballistic projectile using a single stationary angle-only monocular sensor.

12. The method as recited in claim 5 wherein said step of observing said first trajectory characteristics of said ballistic projectile using a single stationary monocular sensor further comprises the step of:

observing said first trajectory characteristics of said ballistic projectile using a passive staring array infrared sensor.

13. The method as recited in claim 5 wherein said step of calculating second trajectory characteristics of said ballistic projectile if said error value is less than said selected limit further comprises the step of:

calculating the origin of said ballistic projectile.

14. The method as recited in claim 5 wherein said step of calculating second trajectory characteristics of said ballistic projectile if said error value is less than said selected limit further comprises the step of:

calculating a destination of said ballistic projectile.

15. The method as recited in claim 8 further comprising the steps of:

g) estimating at least m+1 said first trajectory characteristics of said ballistic projectile using said error value adjusted m state parameters of said ballistic projectile provided said error value is less than said selected limit;

h) observing at least m+1 said first trajectory characteristics of said ballistic projectile using said single stationary monocular sensor;

i) generating an error value of said predicted m state parameters by comparing said estimated m+1 first trajectory characteristics of said ballistic projectile with said observed m+1 first trajectory characteristics of said ballistic projectile;

j) adjusting said prediction of said m state parameters of said ballistic projectile provided said error value is equal to or greater than a second selected limit and repeating steps g) through i) until said error value is less than said second selected limit; and k) calculating second trajectory characteristics of said ballistic projectile provided said error value is less than said second selected limit.

16. A ballistic projectile three-dimensional trajectory determining system comprising:

an estimator receiving predicted state parameters of a ballistic projectile for estimating first trajectory characteristics of said ballistic projectile using said predicted state parameters;

a single stationary monocular sensor for observing said first trajectory characteristics of said ballistic projectile;

a comparator coupled to said single stationary monocular sensor and said estimator for comparing said observed first trajectory characteristics received from said single stationary monocular sensor with said estimated first trajectory characteristics received from said estimator, said comparator generating an error value indicative of a difference between said observed first trajectory characteristics and said estimated first trajectory characteristics; p1 an estimator adjuster receiving said error value from said comparator when said error value is above a selected limit for adjusting said predicted state parameters of said ballistic projectile and causing said estimator to re-estimate said first trajectory characteristics of said ballistic projectile using said adjusted predictions of said state parameters; and a ballistic projectile trajectory calculator coupled to said comparator for determining second trajectory characteristics of said ballistic projectile when said error value is at or below said selected limit.

17. The ballistic projectile three-dimensional trajectory determining system of claim 16 wherein said first trajectory characteristics include azimuth and elevation angles of said ballistic projectile.

18. The ballistic projectile three-dimensional trajectory determining system of claim 16 wherein said single stationary monocular sensor is a passive staring array infrared detector.

19. The ballistic projectile three-dimensional trajectory determining system of claim 16 wherein said single stationary monocular sensor is a single stationary angle-only monocular sensor.

20. The ballistic projectile three-dimensional trajectory determining system of claim 16 wherein said second trajectory characteristics include the origin and destination of said ballistic projectile.

* * * * *